Patented Nov. 3, 1931

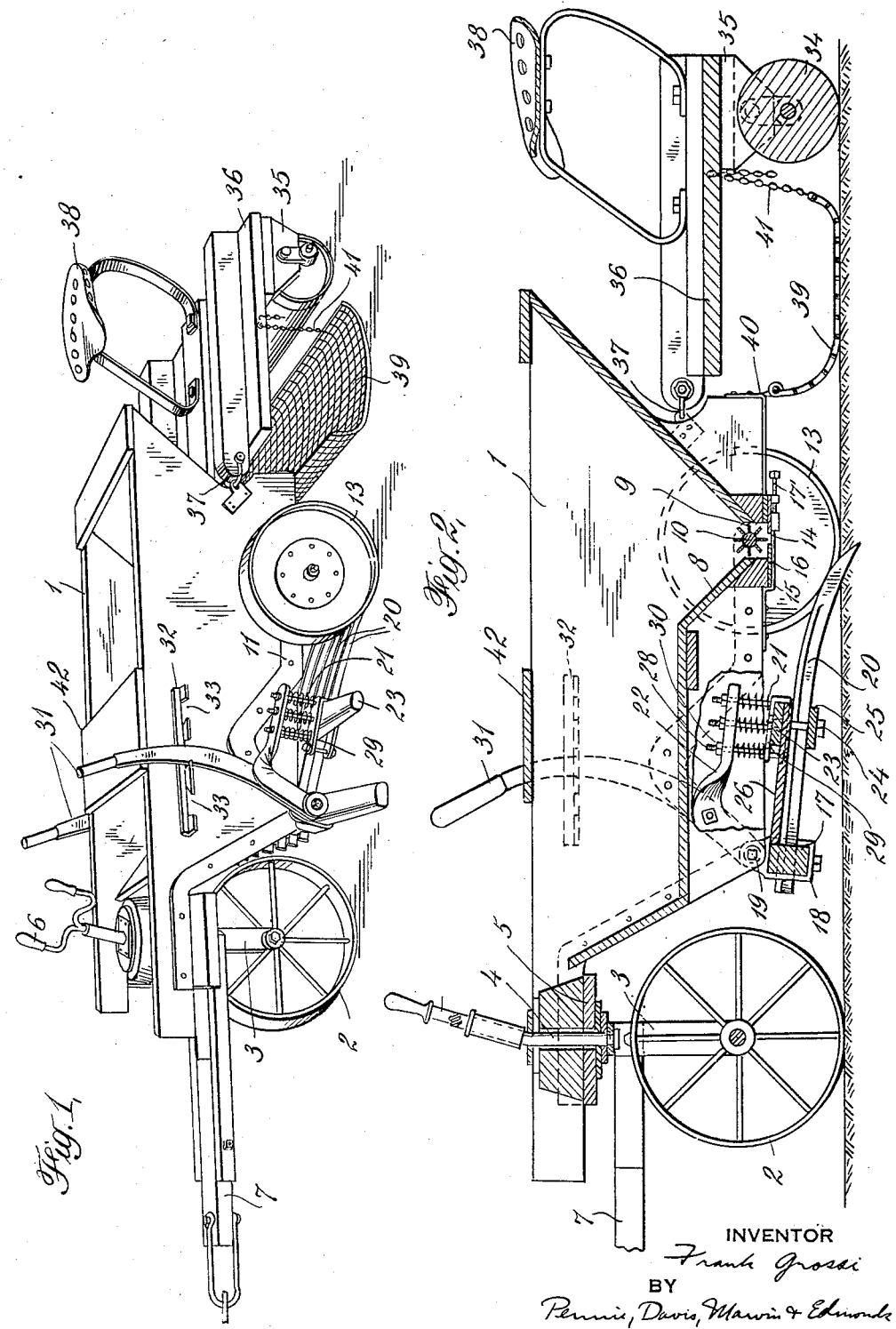

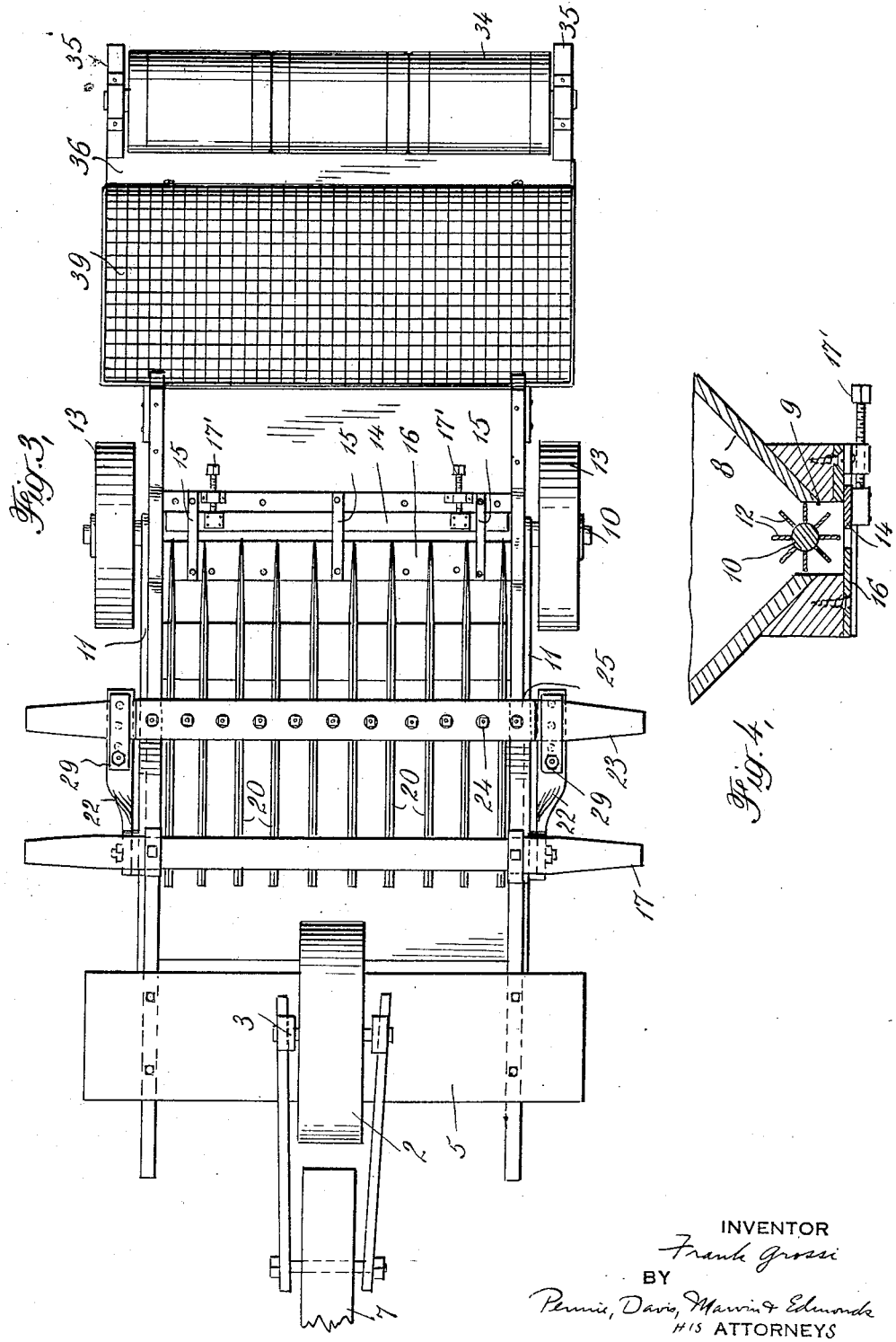

1,829,745

UNITED STATES PATENT OFFICE

FRANK GROSSI, OF MAMARONECK, NEW YORK

TURF PLANTER

Application filed September 22, 1930. Serial No. 483,555.

This invention relates to apparatus for use in seeding and fertilizing turf, and more particularly concerns an improved unitary device for rapidly planting seed and depositing fertilizing material on a sodded area.

Sodded areas, such as lawns, golf courses and like tracts, require considerable care and attention if the grass is to be kept in a healthy condition. This is particularly true of the grass on the greens of golf courses, where the turf must be cut very short and the uniform quality and texture thereof is highly important. During dry periods, the closely cut grass dries up quickly and even with daily sprinkling, some of the grass dies and renders the green unfit for use. Further, frequent watering of the grass often results in too much moisture near the surface of the sod and an uneven surface soon results.

Heretofore, when the grass on golf courses dies, or becomes unfit for use, it has been the practice to plow up the green, relevel it and reseed it. This procedure usually requires the services of twelve men for a week and in addition to this expense, the reseeded green cannot be used again for several months and is usually out of service for the remainder of the season.

With the above noted problems in mind, it is an object of the present invention to produce an efficient device for reseeding, fertilizing, levelling and generally revitalizing the grass of golf greens, lawns or other grass-covered areas. It is a further object of the invention to provide a unitary device for carrying the above objects into effect with a minimum of labor and expense and without interrupting the use of the grass-covered areas for any appreciable period.

In general, the objects of my invention are carried out by providing a grass treating machine which successively cuts a plurality of slits in the grass-covered surface, deposits a mixture of grass seed and fertilizer in the slits and on the surface, closes the cuts in the surface and levels the surface by rolling. The cuts or slits in the sodded surface are preferably formed by a plurality of spaced parallel knife blades which are pressed into the sods by springs or equivalent means, these blades being carried by a vehicle which is further provided with a storage bin for carrying the grass seed and fertilizer. Means are provided for feeding the grass seed and fertilizer to the cut surface of the sod, and the rate at which this material is fed is preferably controlled in accordance with the progress of the vehicle over the tract. To the rear of the seed and fertilizer feeding means, a dragging and agitating device is provided to close the slits in the sod and generally agitate an level the surface thereof, and a roller is preferably provided behind the drag to finally level and pack down the seeded surface. The roller may be carried by an articulated trailer at the rear to the seeded vehicle. The vehicle is preferably provided with steering means, and it is preferred to employ means by which the pressure exerted on the cutting blades may be adjusted. Adjustable means are also preferably provided for controlling the rate at which the grass seed and fertilizer are deposited.

The invention will be best understood by reference to the accompanying drawings in which a preferred embodiment thereof is illustrated. In the drawings;

Figure 1 is a perspective view of a device incorporating the present invention;

Fig. 2 is a sectional side view of the device shown in Fig. 1;

Fig. 3 is a bottom plan view of the device; and

Fig. 4 is an enlarged sectional view of the seed and fertilizer feeding mechanism of the device.

Referring to the drawings, the disclosed embodiment of my invention includes a three wheeled vehicle, the body portion of which comprises a storage bin 1. The single front wheel 2 of the vehicle is pivotally connected thereto in any suitable manner, and as shown, the fork 3 carrying the wheel 2 is fixed to a vertical king bolt or pivot 4 passing through the forward support 5 of the vehicle body. Suitable steering means, such as the handle bars 6, are fixed to the pivot 4 so that the vehicle may be guided by an operator. A draw bar 7 of any suitable form is attached to the fork 3, and the vehicle may be propelled by a tractor or a draft animal hitched to the draw bar.

As shown in Fig. 2, the storage bin 1 of the vehicle is provided with a downwardly converging portion 8 having a transversely extending outlet or discharge slot 9 at its lower apex. The rear axle 10 of the vehicle is journaled in suitable brackets 11 fixed to the sides of the bin 1, and this axle passes through the center of the discharge slot 9 as shown in Figs. 2 and 4. The portion of the axle 10 which lies within the slot 9 is provided with a plurality of radial feed paddles 12 which extend substantially across this slot but clear the sides thereof sufficiently to revolve therein. The rear wheels 13 of the vehicle are fixed to the ends of the axle 10 so that as the vehicle moves, the axle 10 and the feed paddles 12 rotate within the discharge slot 9 and feed the seed and fertilizer from the bin 1 to the ground at a rate proportional to the rate of progress of the vehicle. The lower end of the discharge slot 9 is provided with an adjustable gate in the form of a plate 14 slidably supported on the guides 15 and cooperating with an opposed fixed plate 16. One or more spaced adjusting screws 17 or other suitable means are employed for variably adjusting the position of the movable plate 14 relative to the fixed plate 16 and thereby regulating the size of the opening through which the grass seed and fertilizer is fed from the bin 1.

A transversely extending knife carrying beam 17 is pivotally supported beneath the vehicle body just behind the front wheel 2. As shown in Figs. 2 and 3, a strap 18 is preferably passed around the bar 17 near each end thereof and the straps are respectively pivotally secured to the transverse bolts 19 fixed to the vehicle body. The bar 17 is preferably formed of wood and a plurality of spaced parallel knife blades 20 are fixed in openings in the bar. The knife blades 20 are vertically disposed with their sharp edges downward and are preferably curved downwardly toward their rearward trailing ends, as shown in Fig. 2. The knife blades are preferably provided with very keen cutting edges and are gradually tapered toward these edges so that the slits formed by these blades are of appreciable width at the surface of the sod. Although various forms of blades may be employed, it has been found that scythe blades are particularly suited for this purpose.

As explained above, means are preferably provided for resiliently pressing the knife blades 20 into the turf. In the disclosed embodiment, the means so employed comprise two sets of coiled springs 21 compressed between a lever 22 and a transverse beam 23. The beam 23 extends across all of the knife blades 20 and transmits pressure from the springs 21 to the blades through a member 26 which bears directly against the upper edges of the blades. The beam 23 is clamped to the member 26 and to the blades 20 by a plurality of bolts 24 which pass through the beam 23, the member 26 and a transverse bar 25 engaging the lower edges of the blades. The member 26 rests on the upper edges of the blades 20 and extends to the pivoted beam 17. On each side of the vehicle body, a rearwardly extending lever 22 is pivotally carried by the bolt 19. The levers 22 extend over the outer ends of the beam 23, and a plurality of bolts 28, fixed at their lower ends of the beam 23 by straps 29, pass loosely through openings near the ends of the levers 22. The coiled springs 21 are carried by the bolts 28 between the levers 22 and the straps 29, and thus when the levers 22 are depressed, the springs 21 exert a downward pressure on the beam 23 and the blades 20 secured thereto. The upper ends of the bolts 28 are provided with nuts 30, so that the blades 20 may be lifted clear of the ground when the levers 22 are raised.

Each lever 22 is fixed to an upwardly extending operating handle 31, these handles being pivoted on the bolts 19. An outward extending bracket 32 having a plurality of notches 33 therein is fixed to each side of the vehicle body in the path of travel of each of the handles 31. When the handles 31 are moved into one of the rearward notches in the brackets 32, as shown in Figs. 1 and 2, the levers 22 are depressed, the springs 21 compressed and the ends of the blades 20 are resiliently forced into the ground. The amount of pressure exerted on the blades 20 may be altered by moving the handles 31 to different notches in the brackets 32. When it is desired to move the vehicle with the blades out of contact with the ground, the handles 31 are moved in the foremost notches in the brackets 32, and the levers 22, acting though the bolts 28 and the nuts 30, lift the beam 23 and the blades 20 clear of the ground. When in the depressed position, the trailing ends of the blades 20 cut into the turf as a point just in advance of the seed discharge slot 9 in the storage bin 1.

A roller 34 is provided in a position to the rear of the seeding slot 9, and in the disclosed embodiment, this roller is journaled between bearing brackets 35 depending from a trailing platform 36. The platform 36 is preferably hingedly connected to the rear end of the storage bin 1 of the vehicle by suitable means such as links 37. The platform 36 may be weighted by sand bags, or an operator may ride thereon in the seat 38 to maintain the proper pressure on the roller 34.

A flexible link drag 39 is preferably disposed transversely across the machine beneath the platform 36 to close the slits cut in the sod by the device and to generally agitate the surface of he tract and distribute the seed and fertilizer thereover. As shown, the drag 39 may be supported by its forward and rearward ends by the links and chains 40 and 41, respectively attached to the vehicle body and to the trailing platform 36.

In operation, the knife blades 20 are set to penetrate the turf by means of the handles 31, the bin 1 is filled with a suitable mixture of grass seed and fertilizer, the platform 36 is weighted by sand bags or by an attendant and the machine is drawn across the golf green or other grass-covered tract to be treated. An operator seated on the transverse platform 42 steers the vehicle by means of the handle bars 6. The discharge opening of the bin 1 is adjusted to feed the required amount of seed and fertilizer by means of the screws 17'. As the device passes over the tract under treatment, the blades 20 cut a plurality of parallel slits in the sod and the seed and fertilizer mixture is dropped into these slits and on to the surface of the sod therebetween. The link drag 39 then agitates the sod surface, distributing the seed and fertilizer and at least partially closing the slits. The roller 34 completes the treatment by pressing the sod to a level and even surface and completely closing the slits cut by the blades 20. Due to the use of the feeding paddles 12 propelled by the rear axle 10, the rate at which the seed and fertilizer mixture is deposited varies in accordance with the rate of movement of the vehicle. Accordingly, the amount of seed and fertilizer deposited on a given portion of the tract is fixed by the adjustment of the plate 14 and is substantially independent of the rate of movement of the vehicle.

Although I prefer to employ knife blades of the type described for cutting the turf, the invention, in its broader aspects, is not limited to this particular form of turf penetrating means. After treatment by the device, dead or partly dead grass may be restored to a healthy state in about a week. New grass grows, not only along the slits cut in the surface, but the agitating treatment revitalizes the intervening strips of grass as well as an even thick turf is accordingly produced.

I claim:

1. In a turf treating device of the character described, in combination, a vehicle including a container, means mounted beneath said container for cutting a plurality of slits in the turf over which said vehicle is drawn, a discharge slot in said container disposed adjacent said cutting means and extending transversely across the vehicle, means for adjustably varying the opening of said slot, a vehicle axle extending through said slot, vehicle wheels fixed to said axle and feeding means on said axle within said slot for controlling the rate of discharge of material from said container in accordance with the rate of progress of said vehicle.

2. In a turf treating device of the character described, in combination, a vehicle, a transversely extending beam pivotally supported beneath the vehicle adjacent the forward end thereof, a plurality of spaced knife blades fixed to said beam and extending rearwardly of the vehicle from said beam with their cutting edges disposed downwardly, resilient means for applying a downward pressure to said knife blades whereby the rearward ends of said blades are pressed into the turf beneath the vehicle, a storage bin on said vehicle having an outlet opening adjacent the rearward ends of said knife blades, and means for depositing material from said storage bin through said opening to the cut turf adjacent the rearward ends of said blades in accordance with the rate of progress of the vehicle.

3. In a turf treating device of the character described, in combination, a vehicle including a container, a transversely extending pivotally supported beam beneath the vehicle adjacent the forward end thereof, a plurality of spaced parallel knife blades fixed to said beam and extending rearwardly of the vehicle from said beam with their cutting edges disposed downwardly, resilient means for applying a downward pressure to said knife blades whereby the rearward ends of said blades are pressed into the turf beneath the vehicle, means for variably adjusting the pressure applied to the blades by said resilient means, means for discharging material from said container to the turf adjacent the rearward ends of said knife blades at a rate controlled in accordance with the rate of progress of said vehicle, and means for variably adjusting the rate of flow of said material.

In testimony whereof I affix my signature.

FRANK GROSSI.